United States Patent [19]

Hatanaka et al.

[11] Patent Number: 4,850,675
[45] Date of Patent: Jul. 25, 1989

[54] LIGHT GATE ARRAY HAVING GATES OF DIFFERENT AREAS

[75] Inventors: Isamu Hatanaka; Masaaki Takimoto, both of Tokyo, Japan

[73] Assignee: Fuji Photo Film Co., Ltd., Kanagawa, Japan

[21] Appl. No.: 890,043

[22] Filed: Jul. 28, 1986

[30] Foreign Application Priority Data

Jul. 29, 1985 [JP] Japan .................................. 60-167319

[51] Int. Cl.⁴ .......................... G02F 1/13; G09G 3/20
[52] U.S. Cl. .............................. 350/331 R; 350/333; 350/342; 350/339 F; 350/339 R; 340/752; 340/793
[58] Field of Search .............. 350/334, 331 R, 339 F, 350/339 R, 333, 342; 340/752, 793

[56] References Cited

U.S. PATENT DOCUMENTS

| | | | |
|---|---|---|---|
| 1,336,254 | 11/1973 | Gunter | 350/334 |
| 4,289,383 | 9/1981 | Schwarzschild | 350/334 |
| 4,495,492 | 1/1985 | Anderson et al. | 340/793 |
| 4,531,160 | 7/1985 | Ehn | 340/793 |
| 4,605,972 | 8/1986 | Hatanaka | 350/332 |

*Primary Examiner*—Stanley D. Miller
*Assistant Examiner*—Trong Q. Phan
*Attorney, Agent, or Firm*—Sughrue, Mion, Zinn, Macpeak, and Seas

[57] ABSTRACT

A light gate array in which each of the gates is individually controllable. Uniform light is gated through the array to form a dot-matrix image on a photosensitive material. The light gates have differing areas or shapes so that different light intensities are gated by the different gates. The array is useful when the same area of the photo-sensitive material is selectively exposed through multiple gates of different areas or shapes.

7 Claims, 6 Drawing Sheets

FIG. 5A
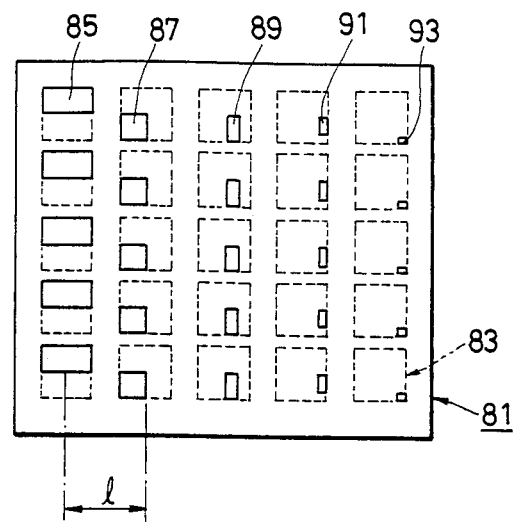
FIG. 5B
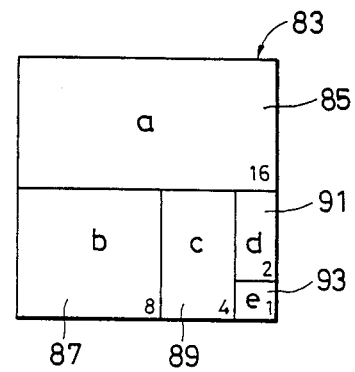
FIG. 5C
| GRADATION | SHUTTER DATA | | | | | PIXEL SHAPE | AREA (×A) |
|---|---|---|---|---|---|---|---|
| | 85 | 87 | 89 | 91 | 93 | | |
| 1 | × | × | × | × | × | ☐ | 0 |
| 2 | × | × | × | × | ○ | ▫ | 1/31 |
| 3 | × | × | × | ○ | × | ▫ | 2/31 |
| 4 | × | × | × | ○ | ○ | ▫ | 3/31 |
| 5 | × | × | ○ | × | × | ▫ | 4/31 |
| 6 | × | × | ○ | × | ○ | ▫ | 5/31 |
| . | . | . | . | . | . | | . |
| 17 | ○ | × | × | × | × | ▬ | 16/31 |
| . | . | . | . | . | . | | . |
| 32 | ○ | ○ | ○ | ○ | ○ | ■ | 1 |

LIGHT GATE ARRAY HAVING GATES OF DIFFERENT AREAS

BACKGROUND

1. Field of the Invention

The invention relates to the structure of a light gate. In particular, it relates to an array of optical shutters which are selectively opened and closed by external electrical signals to transmit and block light.

2. Background Art

In the past, a variety of light gates have been used in picture forming devices. These optical gates have optical shutters of PLZT (lead zironate titanate doped with lanthanum: lead lanthanum zirconate titanate) or of liquid crystal.

The light gate of this type has been disclosed, for instance, in Japanese Utility Model Application (OPI) No. 113541/1980 (the term "OPI" as used herein means an "unexamined published application" or unexamined PCT Patent Application No. 502242/1982, published in Japan. In this light gate, a ferro-dielectric ceramic panel of PLZT is arranged between two polarizing plates which are so arranged that the polarization axes thereof are perpendicular to each other. Voltage is applied across comb-shaped common electrodes on one hand located on the panel and signal electrodes on the other hand located between the common electrodes (the comb teeth). An electric field is thus created between the signal and common electrodes. As a result, the PLZT between these electrodes is made birefringent, so that the direction of polarization of light passing through the PLZT is rotated. The rotation of the plane of polarization of incident light is controlled according to whether or not voltage is applied across the electrodes. When the polarization axis of the light incident upon of the polarizing plate on the output side of the light gate coincides with that of the plate, the incident light passes through the light gate, and if not, the incident light is blocked thereby.

A variety of light gates using a liquid crystal have been proposed in the art. One example of the light gate has been disclosed, for instance, in Japanese Patent Application (OPI) No. 98073/1981. In the light gate, a liquid crystal layer is formed between two polarizing plates in the same manner as in the above-described light gate using PLZT. Transmission of light through the light gate is controlled by controlling the application of voltage across two transparent electrodes which are formed on both sides of the liquid crystal layer and subjected to rubbing. The general liquid crystal light gate is of twisted nematic type, and the twisted nematic type gates are further classified into a group of negative type and a group of positive type gates A variety of methods have been proposed in the art in which the above-described light gate is disposed between a light source and an image forming plate (such as a photo-sensitive material). The optical shutters of the light gate are driven by external electrical signals (which may be referred to as "image data") to form an image on the light gate and the output light of the light source passed through the image is utilized to form the image on the photo-sensitive material.

In the picture forming method disclosed in unexamined PCT Patent Application No. 502242/1982, published in Japan, the above-described PLZT light gate is used to form a continuous tone image on the recording medium.

In the picture forming method disclosed by Japanese Patent Application (OPI) No. 98073/1981, the above-described liquid crystal light gate is interposed between a light source and an "electrofax" sheet, and the light gate is driven with electrical signals to form a picture.

In any one of the above-described light gates, the optical shutters are provided for the respective picture elements (pixels) of a picture, (in such a manner that one optical shutter corresponds to one picture element or pixel) and the optical shutters all have the same configuration. Therefore, it is impossible to form a pixel by using the optical shutters of the light gate in combination, or to provide gradations through the variations of area which are obtained by using the optical shutters individually or in combination.

The picture forming method using the PLZT light gate is advantageous in that the optical shutters are higher in response speed than those of the liquid crystal light gate and more suitable for gradation control. However, in the method, the irregularity of the pixels comprising the light gate array results in the formation of stripe-like patterns in forming a picture on the photosensitive material. This difficulty is too serious to form a picture rich in gradation

SUMMARY OF THE INVENTION

Accordingly, an object of this invention is to provide a dot forming light gate in which some or all of the optical shutter of the light valve are different from one another in configuration and/or size, and these optical shutters are used individually or in combination, to readily form a dot picture having excellent uniformity between picture elements.

The invention can be summarized as a light gate comprising a plurality of optical shutters which. are opened and closed by external electrical signals to transmit and block light. According to the invention, at least one of the optical shutters is different from the remaining optical shutters in configuration and/or size.

The light gate may be so modified that at least two optical shutters are different from each other in configuration and/or size.

In practicing the invention, it is preferable that the plurality of optical shutters are arranged in a matrix form in such a manner that the optical shutters different in configuration and/or size from one another are arranged in all of the lines of the matrix in the same order.

Further in practicing the invention, it is preferable that n optical shutters be arranged in each line of a matrix. Then, the configuration, size and arrangement of the n optical shutters are so determined that if A is the sum of the aperture areas of the n optical shutters, then the area a of the optical shutter having the smallest aperture area is equal to $A/(2^n-1)$. In the case where none of the optical shutter is used, the total aperture area is zero. In the case where the n optical shutters are used individually or in combination the resultant total aperture area S can assume the values m.a where m represents integers from 1 to $(2^n-1)$. As a result, there are provided $2^n$ values of aperture areas.

In the light gate of the invention, the plurality of optical shutters are different from one another in the size and/or configuration of the apertures when they are opened by external electrical signals. When any one of the optical shutters of the light gate is opened, the effective area of the optical shutter through which light passes depends on the size of its aperture area. Therefore, when a photo-sensitive material is exposed to the light beams passing through the optical shutters, the areas of the dots (exposed parts of the photo-sensitive material) formed on the photo-sensitive material are different depending on the areas of the apertures of the optical shutters. For instance, in the case where the apertures of optical shutters are made suitable in size and configuration, and the optical shutters are used individually or in combination, $(2^n-1)$ different dot areas can be obtained when the photo-sensitive material is exposed to the light beams passed through the optical shutters As is apparent from the above description, with the light gate of the invention, dots different in area can be formed on the photo-sensitive material to provide grated pictures by using individually or in combination the optical shutters different in aperture area. Therefore, the optical shutters can be controlled by binary electrical signals to open and close.

BRIEF DESCRIPTION OF THE DRAWINGS

FIGS. 5A and 5B are diagrams for a description of a second example of the light gate according to the invention.

FIG. 5C is a table illustrating the use of the embodiment of FIGS. 5A and 5B.

DETAILED DESCRIPTION OF THE PREFERRED EMBODIMENTS

FIRST EMBODIMENT

Light Gate

Figure 1A:
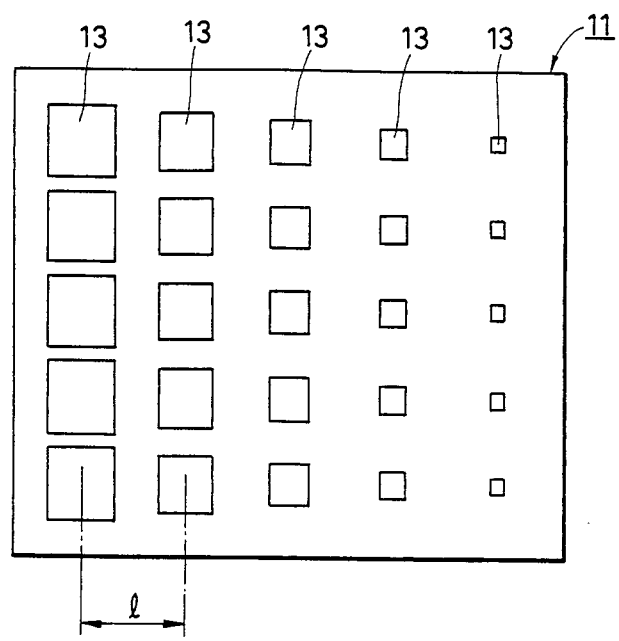
FIG. 1A is a plan view showing a first example of a light gate according to this invention.
Figure 1B:
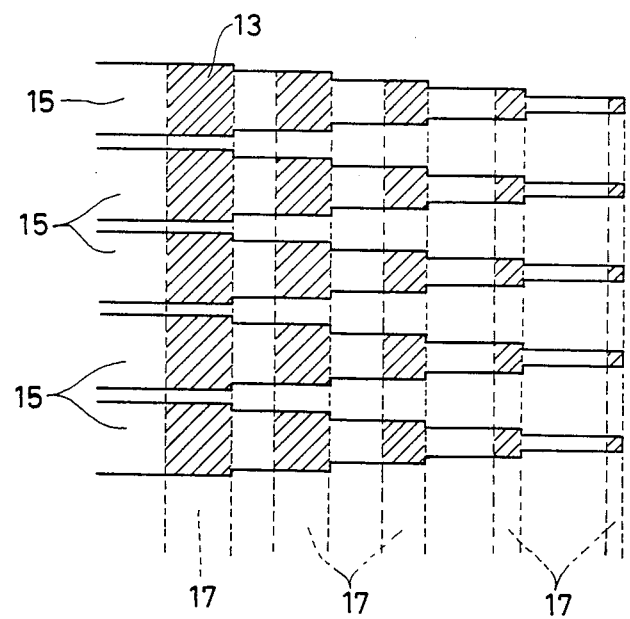
FIG. 1B is a plan view showing the arrangement of electrodes in the light gate of FIG. 1.
Figure 2:
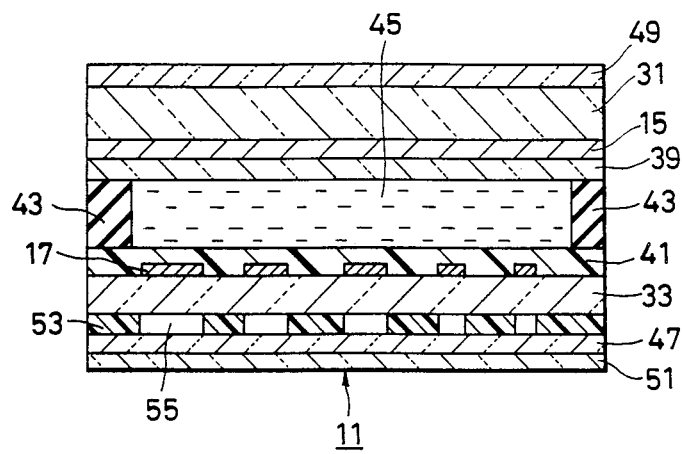
FIG. 2 is a sectional view of the light gate.

FIG. 1A is a plan view showing a light gate according to the invention, and FIG. 1B is a diagram showing the arrangement of horizontal and vertical electrodes which are components of the light gate. FIG. 2 is a sectional view of the light gate.

First, optical shutters provided in the light gate will be described. In FIG. 1A is shown a light gate or liquid crystal panel 11. In the light gate 11 (which may be referred to as "the liquid crystal 11", when required) twenty-five (25) square optical shutters 13 are arranged in a (5×5) matrix form with a predetermined pitch. In the first horizontal line, the five optical shutters 13 are different from one another in size. In each of the second through fifth lines, the five optical shutters 13 corresponding in position to those in the first line are equal in size to the corresponding ones in the first line. In other words, in each line, the five optical shutters 13 are different in size from one another, but in each column the five optical shutters 13 are equal in size to one another.

An image-forming surface (such as a photo-sensitive material) is provided on one side of the light gate 11 thus constructed, and a light source is provided on the other side so that light is applied to the light gate 11 to form an image on the photo-sensitive material. In this case, the five optical shutters in each line, different in size, are selectively used, to form five kinds of exposed parts different in size on the photo-sensitive material. Therefore, the light gate can provide six (6) gradations including non-exposure. A method of forming pictures with the light valve will be described later.

In FIG. 1B are shown horizontal electrodes 15 in the light gate 11 and vertical electrodes 17 which are laid across a liquid crystal layer (described later) on top of the horizontal electrodes 15. In this case, five horizontal electrodes 15 extend across five vertical electrodes 17. The regions formed at the intersections of the horizontal electrodes 15 and the vertical electrodes 17 are the optical shutters 13.

The construction of the light gate, and especially the dimension, configuration, number and arrangement of the optical shutters are not limited to those which have been described above. That is, they may be changed or modified according to the object of the use of the light valve without departing from the invention.

FIG. 2 is the sectional view of the light gate 11, as was described above. The light gate 11 is made up of a matrix type liquid crystal panel, as was described above. The fundamental construction is the same as the construction of a conventional liquid crystal panel; however, the construction, and the operating principle thereof will be briefly described.

In FIG. 2 is shown an upper glass plate 31 and a lower glass plate 33. Five transparent horizontal electrodes 15 (only one is shown in FIG. 2) are arranged on the surface of the upper glass plate 31, while five transparent vertical electrodes 17 are arranged on the surface of the lower glass plate 33. Orientation films 39 and 41, adapted to orientate nematic liquid crystal molecules in one direction, are formed on the horizontal electrodes 15 and the vertical electrodes 17. A preferred example of the orientation films 39 and 41 is a PVA (Polyvinyl Alcohol) film. The film is coated over the glass support and then thermally set. Thereafter, the film is rubbed in a predetermined direction by a brush and the like to form orientation scratches. The upper and lower glass plates 31 and 33 are arranged in such a manner that the horizontal electrodes 15 are confronted with and extend across the vertical electrodes 17 and there is a space between the upper and lower glass plates. The upper and lower-glass plates 31 and 33 thus arranged are bonded together with sealing material 43. The regions where the horizontal electrodes 15 confront with the vertical electrodes 17 are the optical shutters 13 of the liquid crystal panel 11, respectively as is shown in FIGS. 1A and 1B. The sealed space between the glass plates is filled with twisted nematic liquid crystal 45 in a well-known manner. In the invention, a liquid crystal having a high duty ratio, which is generally used for data displaying matrix type liquid crystal panel, is preferably employed as the twisted nematic liquid crystal 45.

A polarizing plate 49 is provided on the outer surface of the upper glass plate 31, and a mask layer (to be described later) 53 is formed on the outer surface of the lower glass plate 33. A filter 47 is provided on the mask layer 53. Furthermore, a polarizing plate 51 is provided on the filter 47 in such a manner that the polarization axis thereof is in parallel with the polarization axis of the polarizing plate 49. A liquid crystal panel with two polarizing plates which are arranged as described above is called "a negative liquid crystal panel".

The previously mentioned mask layer 53 is an opaque film which has light transmitting windows 55 at the positions which correspond to the positions of the optical shutters 13, respectively, so that light transmission is permitted only through the light transmitting windows 55. The mask layer 53 is formed by a spattering of a metal such as chromium Cr. Since this invention uses the aforementioned negative liquid crystal panel, masking can be readily achieved with the mask layer 53 to prevent the light leaks other than those at the optical shutters 13. However, a so-called "positive liquid crystal panel" having two polarizing plates arranged in such a manner that the polarization axes thereof cross each other may be employed. In this case, the behavior of the liquid crystal panel as to the transmission and non-transmission of light due to the application and non-application of voltage to the electrodes is opposite to that of the negative liquid crystal panel.

In the liquid crystal panel 11 thus constructed, the twisted nematic liquid crystal molecules on the horizontal electrodes 15 are different by 90° in the direction of orientation from those on the vertical electrodes 17. In the case where no voltage is applied to the optical shutters 13 (i.e., between the horizontal electrodes 15 and the vertical electrodes 17) of the liquid crystal panel 11, the light beam passing through the upper polarizing plate 49 is a linearly polarized light beam, which goes into the nematic liquid crystal 45, and reaches the lower polarizing plate 51 with the plane of polarization rotated 90° according to the molecular orientation of the liquid crystal 45. In this case, since the polarization axis of the lower polarizing plate 51 is in parallel with that of the upper polarizing plate 49, as was described before, the light beam reaches the lower polarizing plate 51 with its plane of polarization rotated 90°, that is, orthogonally oriented to the polarization axis of the lower polarizing plate 51. Thus the beam is blocked by the lower polarizing plate 51. On the other hand, a threshold voltage (hereinafter referred to as "a threshold value", when applicable) provides a TN (Twisted Nematic) effect when a voltage which is somewhat higher than the threshold voltage is applied to the optical horizontal and vertical electrodes. The degree of polarization rotation in the liquid crystal 45 determines what percentage of light is transmitted through the lower polarization plate 51. Hence small variations in the polarization rotation produces small variations in the transmitted light. A gradual increase in the transmitted light will be referred to as an increase in the liquid crystal opening.

The degree of opening of the liquid crystal varies with the voltages in the above-described range. The degree of opening of the liquid crystal varies while the voltage applied across the vertical and horizontal electrodes is being changed. The positive liquid crystal panel is more regular in the variation of the degree of opening of the liquid crystal with respect to the applied voltage than the negative liquid crystal panel. Therefore, the positive liquid crystal panel can more readily control the transmission of light than the negative liquid crystal panel.

Figure 3:
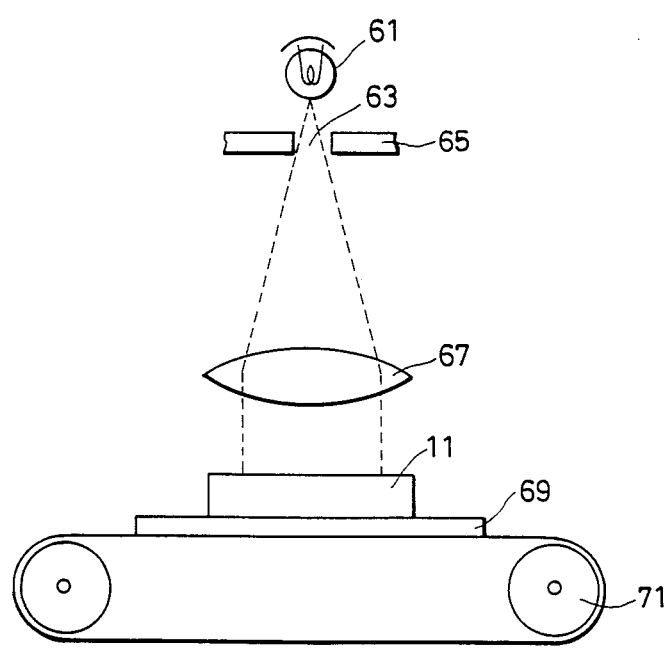
FIG. 3 is an explanatory diagram showing the arrangement of one example of a dot-matrix picture forming apparatus using the light gate of this invention.

FIG. 3 is an explanatory diagram outlining the construction of one example of the dot picture forming apparatus using the light valve according to the invention.

In FIG. 3, a halogen lamp or xenon flash can be used as a point light source 61. An aperture member 65 with a pin hole 63 is set in front of the point light source 61 in order to convert the point light source 61 into the ideal point light source. A lens 67 changes the diverging light beam into a parallel light beam. The lens 67 and the liquid crystal panel 11 are disposed in the stated order on the axis of the light beam from the point light source 61 which has passed through the pin hole 63. A conveying mechanism 71 is arranged below the liquid crystal panel 11. The conveying mechanism 71 conveys a photo-sensitive material 69 to the liquid crystal panel 11. The conveying mechanism 71 is capable of moving the photo-sensitive material 69 at the intervals (shown as in FIG. 1) equal to the pitch of the optical shutters 13 arranged in a matrix form. The conveying mechanism 71 brings the photo-sensitive material 69 into close contact with the liquid crystal panel 11 during the exposure of photo-sensitive material 69 to light for picture formation.

Figure 4:
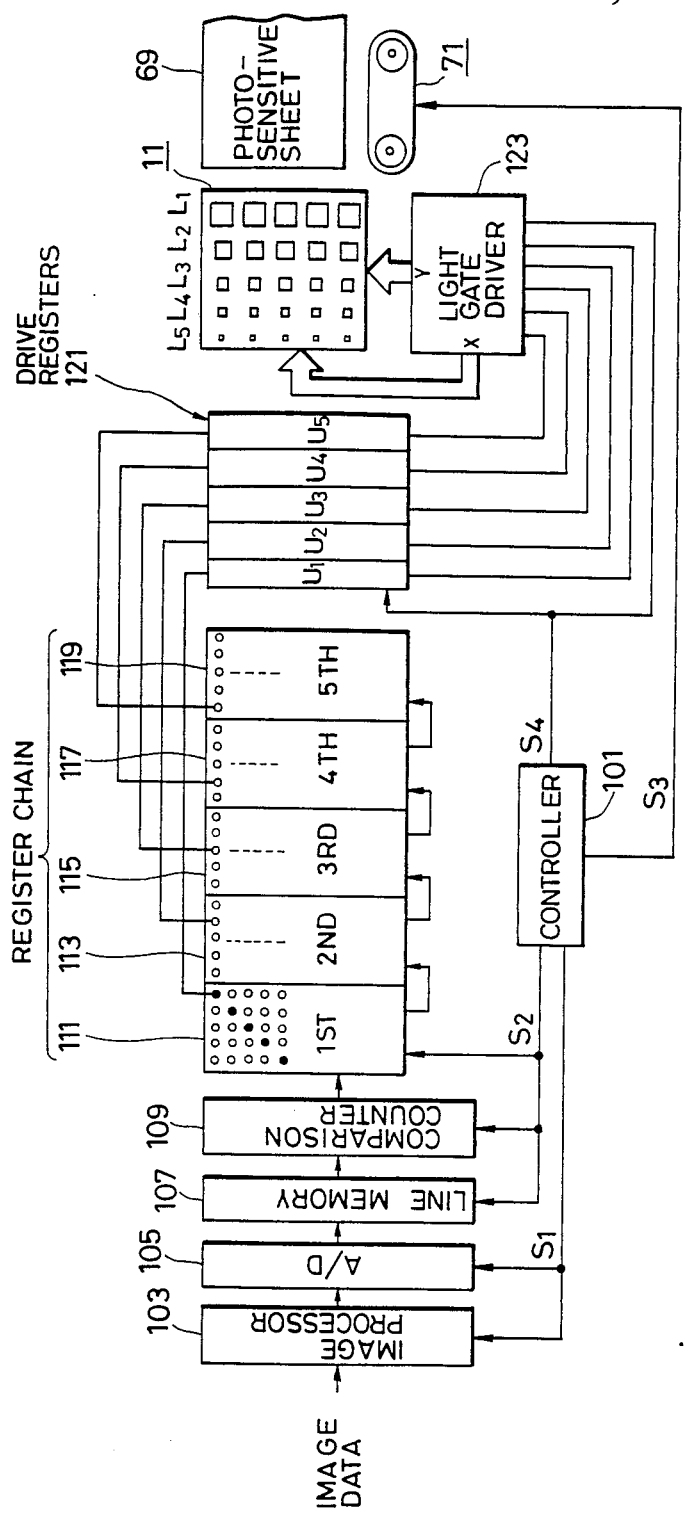
FIG. 4 is a block diagram of a circuit used for driving the apparatus shown in FIG. 3.

FIG. 4 is a block diagram showing a circuit used in forming a dot picture with the above-described apparatus. One example of the dot picture forming method according to the invention will be described with reference to FIGS. 3 and 4. More specifically, the method will be described with reference to the case where a dot picture is formed with the 5×5 matrix light gate shown in FIG. 1.

In FIG. 4, a control section 101 exercises overall control. A picture processing circuit section 103 reads the output signals of a television set, a computer or the like in synchronization with a signal $S_1$ output by the control section 101. The signals thus read are converted into density data for every picture element, which is sent to an A/D (analog-to-digital) conversion circuit section 105. The density data is converted into digital data by the A/D conversion circuit section 105, which is delivered to a line memory 107 in synchronization with the signal $S_1$ so that it is stored therein. That is, the density data are successively stored in the line memory 107.

Next, in synchronization with a signal $S_2$ from the control section 101, the density data of the first five pixels (in the first column of the light gate), that is, the density data of pixels for the first column of the photo-sensitive material 69, are applied to a comparison count section 109 by the line memory 107. According to the density of each pixel, the comparison count section 109 determines the configuration and kind of an optical shutter to be used, or determines that no optical shutter should be used (non-exposure). In other words, the comparison count section 109 determines the conditions of exposure of the photo-sensitive material for every picture element. In this case, as the light gate includes five kinds of optical shutters different in size as was described before, six different exposure conditions can be obtained by selecting the non-exposure and the five kinds of optical shutters. That is, the comparison counter 109 converts density data to exposure data appropriate to the characteristics of the photo-sensitive material 69. In a simple embodiment, the comparison counter 109 selects one or possibly none of the five bits, with the most significant bit corresponding to an optically dense pixel, as determined by the output of the A/D circuit 105.

The exposure conditions thus determined are converted into 5-bit signals by the comparison count section 109, in the embodiment. The individual bits of the 5-bit signals correspond to the five kinds of optical shutters, respectively. More specifically, the five bits are referred to as "the first, second, third, fourth and fifth bits", respectively, beginning with the most significant bit, and the first through fifth bits correspond to the optical shutters in the order of size, respectively, beginning with the largest optical shutter When any one of the five bits is at a high level (hereinafter referred to as "a 1 level" or merely as "1", when applicable) the optical shutter corresponding to the bit is driven by a liquid crystal drive circuit 123 (to be described later) to transmit light from the light source 61, thereby to expose the photo-sensitive material 69. In the case where the exposure condition of five bits is "0 0 0 0 0", none of the shutters are used (non-exposure).

Next, the 5 bits of exposure condition data of picture elements are applied to a first register 111 by the comparison count section 109 until the 5-bit data of the first five pixels in the first column are stored In FIG. 4, is shown a light gate driving register 121 (hereinafter referred to as "a driving register 121"). The first bit through the fifth bit exposure condition data are supplied respectively from the first through fifth registers 111-119 and are temporarily stored in the driving register 121. The driving register 121 is made up of five units ($U_1$ through $U_5$ in FIG. 4) which are connected through five bus lines from the first through fifth registers 111-119, respectively. That is, the bus lines are so connected that the first bit data is delivered from the first register 111, the second bit data is delivered from the second register 113, and so on up to the fifth bit data delivered from the fifth register 119. The driving register 121 is connected to a light gate drive section 123.

The light gate drive section 123 is adapted to drive the optical shutters of the light valve according to the data delivered through the driving register 121 from the first through fifth registers. The light gate drive section 123 comprises conventional X- and Y-drivers or the like.

On the other hand, in response to a signal $S_3$ from the control section 101, the conveying mechanism 71 is driven to move the photo-sensitive material 69 to the position below the optical shutter column $L_1$.

Under this condition, in synchronization with a signal $S_2$ from the control section 101, the exposure condition data of picture elements stored in the first register 111 are applied successively to the driving register 121 beginning with the most significant bit, so as to be stored therein. In practice, of the 5-bit exposure condition data of the pixels, only the first bit data are delivered to and stored in the unit $U_1$ of the driving register 121. On the other hand, in synchronization with the delivery of the exposure condition data, the 5-bit exposure condition data are successively shifted from the first register 111 to the second register 113. At the same time, the density data of the next five (5) pixels (in the second column) are supplied to the comparison circuit section 109, so the exposure conditions of the picture elements are determined by the comparison circuit section 109 and are then stored in the first register 111.

Next, in response to a signal $S_4$ from the control section 101, the first bit data of picture elements stored in the unit $U_1$ of the driving register 121 are applied to the light gate drive section 123. When the data of a given one of the pixels whose data have been applied to the light gate drive section 123 is "1", the X-driver and the Y-driver of the light gate drive section 123 are operated so that, in the optical shutter column $L_1$, the optical shutter corresponding to the picture element is opened for exposure of the photo-sensitive material. Thus, exposure for the first bit data of the exposure condition data of picture elements in the first column which have been stored in the first register 11 has been accomplished. That is, the exposure for the picture elements which should use the largest optical shutters has been made.

In synchronization with a signal $S_3$ from the control section 101, the conveying mechanism 71 is driven to move the photo-sensitive material 69 a predetermined distance (the distance l shown in FIG. 1A). That is, the portions of the photo-sensitive material 69 which have been located below the optical shutters of the column $L_1$ are moved to the optical shutters of the column $L_2$.

In succession, in response to a signal $S_2$ from the control section 101, the first register 111 supplies the first bit data of the exposure condition data of picture elements in the second column successively to the unit $U_1$ of the driving register 121, while the second register 113 applies the second bit data of the exposure condition data of picture element of the first column, which have been transferred from the first register 111, to the unit $U_2$. The first bit data and the second bit data are temporarily stored in the units $U_1$ and $U_2$, respectively. In this operation, the exposure condition data of the pixels in the first column are shifted from the second register 113 to the third register 115, while the exposure condition data of pixels in the second column are shifted from the first register 111 to the second register 113. Furthermore, the density data of the next five pixels (in the third column) are applied to the comparison circuit 109 by the line memory 107. The exposure conditions of the picture elements are determined by the comparison circuit 109 and are then stored in the first register 111.

The data which have been sent to the units $U_1$ and $U_2$ from the first and second registers 111 and 113 and stored in the driving register 121 are then applied to the light gate drive section 123 in synchronization with the signal $S_4$ from the control section 101. When the data of given ones of the pixels whose data have been delivered to the light gate drive section are "1", the X-driver and the Y-driver of the light gate drive section 123 are operated so that the optical shutters in the proper rows and columns corresponding to the picture elements are opened for exposure of the photo-sensitive material 69. Thus, the exposure for the first bit data of the exposure condition data of pixels in the second column which have been stored in the first register 111, and the exposure for the second bit data of the exposure condition data of pixels in the first column have been accomplished.

Thereafter, in synchronization with the output signal $S_3$ of the control section 101, the conveying mechanism 71 is driven to move the photo-sensitive material 69 the predetermined distance l towards along the light gate 11. As a result, the portions of the photo-sensitive material 69 which have been located below the optical shutters of the column $L_2$ are moved to the optical shutters of the column $L_3$, while the portions of the photo-sensitive material 69 which have been positioned below the optical shutters of the column $L_1$ are moved to the optical shutters of the column $L_2$. In succession, the first register 111 applies the first bit data of the exposure condition data of picture elements of the third column to the unit $U_1$, the second register 113 sends the second bit data of the exposure conditions data of the picture elements of the second column to the unit $U_2$ of the driving register 121, while the third register 117 supplies the third bit data of the exposure condition data of picture elements of the first column to the unit $U_3$ of the driving register 121. On the other hand, the exposure condition data stored in the first, second and third registers 111, 113 and 115 are shifted to the second, third and fourth registers 113, 115 and 117, respectively. Furthermore, the density data of the next picture elements (in the fourth column) are applied to the comparison count section 109 by the line memory 107, and the comparison count section 109 determines exposure conditions therefor, and the exposure condition data are supplied to the first register 111.

The data supplied from the first, second and third registers to the units $U_1$, $U_2$ and $U_3$ are applied to the light gate drive section 123. When the data of given ones of the picture elements whose data have been applied to the light gate drive section are a "1", a drive signal is applied to the liquid crystal drive circuit 123 to open the optical shutters corresponding to these picture elements to subject the photo-sensitive material to exposure. Thus, the exposure for the first bit data of the exposure condition data of picture elements of the third column which have been stored in the first register 111, the exposure for the second bit data of the exposure condition data of picture elements of the second column which have been stored in the second register 113, and the exposure for the third bit data of the exposure condition data of picture elements of the first column which have been stored in the third register 115 have been accomplished.

The following operations are carried out in the same manner. The initially exposed region of the photosensitive material 69 (made up of the picture elements of the first column) is conveyed to the column $L_5$ of the light gate 11, and those picture elements of the first column which are to be exposed through the smallest optical shutters are there exposed. As a result, dots corresponding in size to the density data of the picture elements are formed at the predetermined positions. Thus, the output signals of the television set, the. computer, etc. have been provided as a picture on the photo-sensitive material 69.

That is, according to the above-described method, five kinds of optical shutters different in size included in the light gate 11 can be selectively used according to the degrees of density of the pixels. The photo-sensitive material 69 is exposed to the output light of the light source 61 which has passed through the optical shutters, so that dots different in size are formed on the photo-sensitive material 69. That is, a picture rich in gradation is formed thereon.

The conveying mechanism 71 can convey the exposed photo-sensitive material 69 to a developing unit (not shown) if it should be developed.

SECOND EMBODIMENT

In FIGS. 5A and 5B are shown diagrams of a second example of the light gate according to the invention. More specifically, FIG. 5A is a plan view of the light gate, and FIG. 5B is a diagram showing the arrangement and size of a plurality of optical shutters in the light gate.

In FIG. 5A, a liquid crystal panel 81 is employed as the light gate. A region (encircled by the dotted line) corresponds to each of the picture elements or pixels of a picture which is to be formed by the light gate 81. In FIG. 5B, five (5) kinds of rectangular optical shutters 85, 87, 89, 91 and 93 differ in size from one another. The optical shutters are arranged with five optical shutter equal in size arranged in one column, twenty-five optical shutters of five different sizes are disposed in a 5×5 matrix form. The arrangement and size of these optical shutters will be described in more detail. The areas of the five kinds of optical shutters are as follows:

$$a+b+c+d+e=A$$

where a, b, c, d and e are the areas of the optical shutters, 85, 87, 89, 91 and 93, respectively, and A is the area of the region 83 corresponding to each picture element (hereinafter referred to as "a picture element region 83", when applicable).

The area ratios of the optical shutters are as follows:

$$d:e=2:1$$

$$c:(d+e)=4:3$$

$$b:(c+d+e)=8:7$$

$$a:(b+c+d+e)=16:15$$

That is, the area sizes form a series, with a factor of two between neighbors. The arrangement of the optical shutters 85, 87, 89, 91 and 93 are shown in FIG. 5A, for instance in which the optical shutters are regularly arranged in the square regions 83, with the five kinds of optical shutters disposed in separate vertical lines of the 5×5 matrix mentioned above.

An image forming surface (such as a photo-sensitive material) is provided on one side of the light gate 81 thus formed, and a light source is provided on the other side so that light is applied to the light gate 81 to form an image on the photo-sensitive material. In this case, thirty-one (31) kinds of exposed parts (dots) different in size from one another can be obtained by selectively combining the five kinds of optical shutters in each line. Therefore, thirty-two (32) gradations including the gradation provided in the case of non-exposure can be used in the presentation of density. A method of forming a picture with the light valve 81 will be described later.

A table shown in FIG. 5C indicates in the first column the gradation scale produced by the optical shutter condition or data in the second column. The sub-areas are combined by differing combinations of the optical shutter 85, 87, 89, 91 and 93. The mark "0" indicates that the referenced optical shutter is opened while the mark "X" indicates that it remains closed. In the third column are shown the shapes of the exposed dots. In the fourth column are given the areas of the exposed dot relative to the total area "A" of the pixel.

The operating principle of the liquid crystal panel 81 in the second embodiment is the same as that of the liquid crystal panel in the first embodiment.

The construction of the light gate, and especially the dimension, configuration, number and arrangement of the optical shutters are not limited to those which have been described above. That is, they may be changed or modified according to the purpose of use of the light gate. For instance, the number of kinds of optical shutters may be increased to increase the number of gradations.

DOT PICTURE FORMING METHOD

Now, a method of forming dot pictures by using the above described light gate, namely, the liquid crystal panel 81 will be described.

First, a significant difference between the dot picture forming method of the first embodiment and that of the second embodiment will be described. In the first embodiment, the image of a picture element is formed on the photo-sensitive material by uing one of the plurality of optical shutters that are different in aperture area. One possibility is using none of the shutters. This operation is repeatedly carried out to form the images of picture elements thereby to provide a dot picture of fine gradation. On the other hand, in the second embodiment, the image of a picture element is formed on the photo-sensitive material by using one of the optical shutters different in aperture area, or more than one of them in combination, or none of them, and this operation is repeatedly carried out to form the images of a number of picture elements on the photo-sensitive materials thereby to provide a dot-matrix picture rich in gradation. Accordingly, under the condition that the dot-matrix picture forming method of the first embodiment has an equal number of sizes of optical shutters as those of the second embodiment, the number of kinds of gradations provided by the dot-matrix picture forming method of the second embodiment is much larger than the number of kinds of gradations provided by the dot-matrix picture forming method of the first embodiment.

The dot-matrix picture forming method will be described with reference to FIGS. 3 and 6.

FIG. 3 shows the dot picture forming apparatus in the first embodiment, as was described before. FIG. 6 is a block diagram of a circuit for driving the apparatus of FIG. 3 which uses the above-described light gate 81. The arrangement of the block diagram of FIG. 6 is the same as that of the block diagram of FIG. 4. However, the circuit of the FIG. 6 is different from that of FIG. 4 in the function of the comparison count section 109 and in the form of exposure condition data of each of the pixels. Therefore, the dot-matrix picture forming method of the second embodiment will be described with emphasis on the differences between the two dot picture forming methods.

Figure 6:
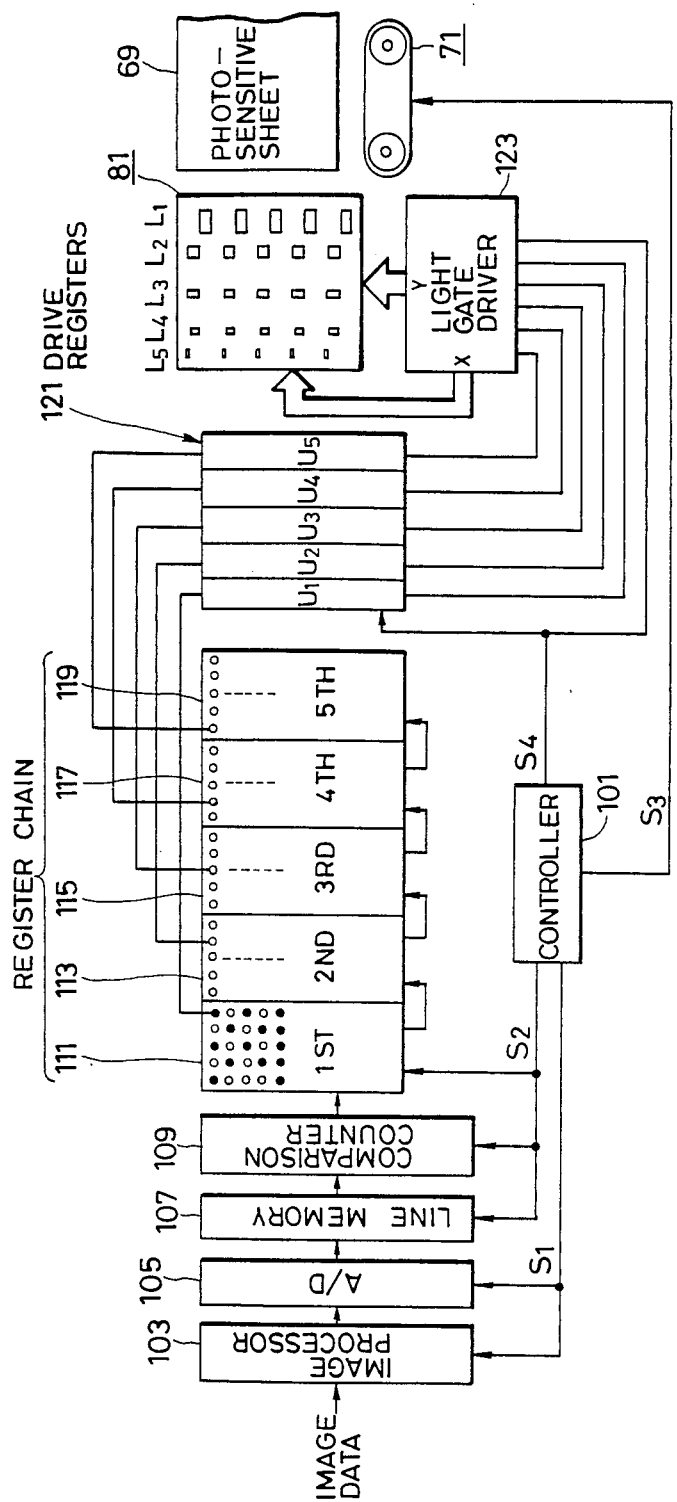
FIG. 6 is a block diagram of a circuit for driving the dot picture forming apparatus of FIG. 3 which employs the second example of the light gate shown in FIG. 5.

In FIG. 6, in synchronization with a signal $S_1$ from a control section 101, a picture processing circuit section 103 reads the output signals of a television set, a computer, etc. The signals thus read are converted into density data for every pixel and these density data are then sent to an A/D (analog-to-digital) conversion circuit section 105. The density data is converted into digital data by the A/D conversion circuit section 105, which is delivered to a line memory 107 in synchronization with the same signal $S_1$ from the control section 101, so that it is stored in the line memory 107. That is, the density data are successively stored in the line memory 107.

Next, in synchronization with a signal $S_2$ from the control section 101, the density data of the first five picture elements (in the first column of the light gate that is, the density data of picture elements for the first column of the photo-sensitive material 69) are applied to a comparison count section 109 by the line memory 107. According to the density of each picture element, the comparison count section 109 determines the kind of an optical shutter to be used, or determines that no optical shutter should be used (non-exposure). In other words, the comparison count section 109 determines the conditions of exposure of the photo-sensitive material 69 for each pixel. So far, the operations are the same as those in the first embodiment. However, it should be noted that, as the light gate has five kinds of optical shutters different in size from one another, thirty-two different exposure conditions can be provided by using the five kinds of optical shutters in combination or using none of them (non-exposure), as was explained with reference to the table of FIG. 5C.

In the second embodiment, the thirty-two (32) exposure conditions thus determined are converted into 5-bit signals by the comparison count section 109. The bits of the 5-bit signals correspond to the five kinds of optical shutters, respectively. More specifically, the five bits are referred to as "the first, second, third fourth and fifth bits", respectively, beginning with the most significant bit, and the first through fifth bits correspond to the optical shutters a, b, c, d and e in the order of aperture area, beginning with the largest optical shutter. When any one of the five bits is at a high level (hereafter referred to as "a 1 level" or merely as "1"), the optical shutter corresponding to the bit is driven by a liquid crystal drive circuit 123 (to be described later) to transmit light from the light source 61 and thereby to expose the photo-sensitive material 69. In the case where the exposure condition of five bits is "0 0 0 0 0", none of the optical shutters are used (non-exposure). In the case of the data being "1 1 1 1 1", all the five kinds of optical shutters are used in combination to form the image of one picture element on the photo-sensitive material.

Next, the five bits of the exposure condition data for the pixels are supplied to a first register 111 by the comparison count section 109 until the data of the first five picture elements (of the first column) in the line memory 107 are stored therein. The operations carried out thereafter are completely the same as those in the first embodiment.

OTHER EMBODIMENTS

The light gates according to the invention, and the dot-matrix picture forming methods utilizing these light gates can be effectively applied to a variety of photographic forming, methods described below.

Applications of the invention will be briefly described with reference to FIGS. 7 through 10. Apparatuses employed in the photograph forming methods are conventional ones and are schematically shown in these figures.

Figure 7:
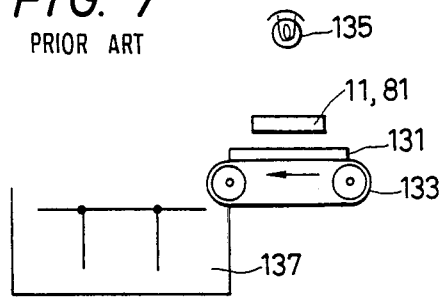
FIGS. 7 through 10 are diagrams for a description of applications of the light gate according to the invention.

In FIG. 7, the light gate 11 (or 81) is built in an apparatus operated according to the ordinary silver halide photography. A photo-sensitive material 131 is moved by a conveying mechanism 133 so that it is positioned below the light gate 11. The photo-sensitive material thus positioned is exposed by light selectively transmitted through the light gate 11 from a light source 135. The photo-sensitive material 131 is conveyed to a silver halide processing unit 137 by the conveying mechanism 133, where it is subjected to developing and other photographic processes to provide a dot processes to matrix picture.

Figure 8:
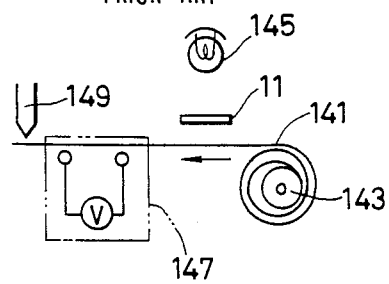

FIG. 8 shows the case where the light-matrix gate 11 is used in an apparatus operated according to a thermal developing silver halide photographic process. A photo-sensitive material 141 in the form of a roll has an electrically heat-generating layer on its surface. The photo-sensitive material 141 is moved by a conveying mechanism 143 so that it is positioned below the light gate 11. The photo-sensitive material 141 thus positioned is exposed through the light gate 11 to light from a light source 145. The exposed part of the photo-sensitive material 141 is conveyed to an electrical thermal developing unit 147 by the conveying mechanism 143, where it is developed. Thereafter, the developed part is cut from the photo-sensitive material 141 with a cutter 149, thus providing a dot-matrix picture.

Figure 9:
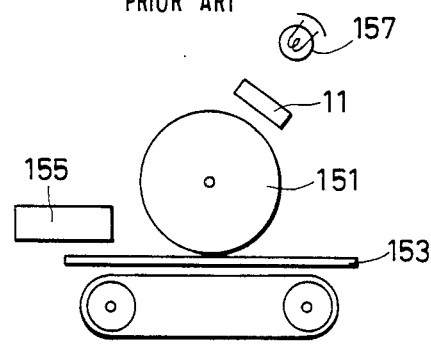

FIG. 9 shows the case where the light gate is employed in an apparatus operated according to electrophotography. In FIG. 9, reference numeral 151 designates a photo-sensitive drum. An image is formed on a photo-sensitive drum 15 by light transmitted through the light gate 11. The image thus formed is transferred, for instance, onto a sheet 153 according to an electrostatic transfer principle. Thereafter, the image transferred onto the sheet is fixed by a fixing unit 155, thus providing a dot-matrix picture.

Figure 10:
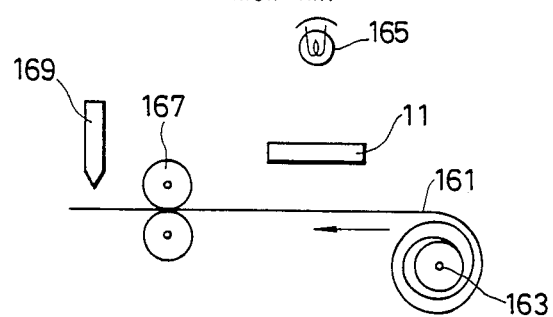

FIG. 10 shows the case where the light gate is employed in an apparatus operated according to a pressure developing photography. A photo-sensitive material 161 is, in the form of a roll, such that an image formed on the photo-sensitive material is developed by pressure. The photo-sensitive material is conveyed by a conveying mechanism 163 so that it is positioned below the light gate 11, where it is exposed through the light gate 11 to light from a light source 165. The exposed part of the photo-sensitive material is developed by being passed through a pair of pressure rollers 167 by the conveying mechanism 163. Thereafter, the developed part is cut from the photo-sensitive material with a cutter 169, thus providing a dot-matrix picture.

Use of the light gate of the invention or the dot-matrix picture forming method using the light valve is effective in forming instant pictures, although this use is not illustrated.

In the above-described embodiments, black and white dot-matrix pictures are formed. However, the same effects can be obtained in forming color dot-matrix pictures according to the invention.

As is apparent from the above description, the dot-matrix forming light gate according to the invention comprises a plurality of optical shutters different in size and/or configuration. Therefore, if the photo-sensitive material is exposed to light beams passed through the optical shutters, then the exposed parts of the photo-sensitive material are different in area in correspondence to the aperture area of the optical shutters. In the case where optical shutters are provided with their apertures having suitable sizes and shapes, the optical shutters can be used individually or in combination so that light passing through the optical shutters can produce ($2^n-1$) kinds of dots (exposed), portions, having different areas on the photo-sensitive material. Thus, a relatively large number of gradations can be obtained with a relatively small number of optical shutters.

The invention allows forming a dot-matrix picture on the photo-sensitive material by controlling the optical shutters of the light gate with external electrical signals representing, for instance, picture data. One or more of the optical shutters, having apertures which can form dots, correspond in size to the density data for the picture data and are selected from the plurality of optical shutters in the light gate. Then the optical shutters are used individually or in combination to expose the photo-sensitive material to thereby produce variations in density of the picture as the variations in dot size. That is, since each optical shutter is merely turned on or off, a binary signal can be used to control the optical shutter. Accordingly, the method of the invention is free from the fluctuation in density which arises in the conventional method in forming in differing area dots by controlling the aperture areas of the optical shutters for each pixel with electrical signals.

Thus, the light gate provided by the invention can readily form dot-matrix pictures which are rich in gradation and free from pixel irregularity.

What we claim is:

1. A dot forming light gate array for selectively transmitting light from a light source to an image receiving surface, comprising:
    a plurality of optical shutters arranged in an array of parallel first lines and parallel second lines intersecting said first lines, for selectively transmitting said light, each said optical shutter having a predetermined optical transmitting characteristic determined by a size thereof and a shape thereof, at least one of said optical shutters differing in said optical transmitting characteristic from another of said optical shutters;
    means for selectively opening and closing any of said optical shutters in response to externally supplied electrical signals;
    a light source disposed on a first side of said optical shutters such that light from said light source impinges on said first side of said optical shutters regardless of values of said electrical signals; and
    a planar image receiving surface disposed on a second side of said shutters for receiving light selectively transmitted therethrough.

2. A dot forming light gate array for selectively transmitting light from a light source to an image receiving surface, comprising:
    a plurality of optical shutters arranged in an array of parallel first lines and parallel second lines intersecting said first lines, each said optical shutter having a predetermined optical transmitting characteristic determined by a size thereof and a shape thereof, at least one of said optical shutters differing in said optical transmitting characteristic from another of said optical shutters, wherein said optical shutters are arranged in a matrix form with a predetermined pitch, said optical shutters being different in size from one another in each said first line of said matrix form but being equal in size to one another in each said second line thereof; and
    means for selectively opening and closing any of said optical shutters in response to externally supplied electrical signals.

3. An array as recited in claim 2, wherein said optical transmitting characteristics are different for said optical shutters arranged on different ones of said second lines.

4. An array as recited in claim 3, wherein "n" optical shutters are arranged on each of said first lines, a smallest one of said optical shutters having an area "a", a sum of areas of all said "n" optical shutters having an area "A", wherein $a = A/(2^n - 1)$, any combination of one or more of said "n" optical shutters have a total area of m·a where m is an integer, possibly being zero, whereby there are $2^n$ values of said total area.

5. An array as recited in claim 4, wherein each of said areas equals $a \cdot 2^p$, where p is an integer between 0 and (n−1).

6. A system as recited in claim 3, wherein said second lines are arranged with a ptich of a predetermined distance and further comprising:

a light source;

means for moving an image receiving surface located on a side of said optical shutter opposite said light source along the direction of said first lines by said predetermined distance; and means for controlling said opening means in synchronism with said moving means.

7. A system as recited in claim 4, wherein said second lines are arranged with a pitch of a predetermined distance and further comprising:

a light source;

means for moving an image receiving surface located on a side of said optical shutters opposite said light source along the direction of said first lines by said predetermined distance; and means for controlling said opening means in synchronism with said moving means.

* * * * *